(12) United States Patent
Lang et al.

(10) Patent No.: US 7,788,210 B2
(45) Date of Patent: Aug. 31, 2010

(54) LOCATING DENSE AND ISOLATED SUB-GRAPHS THROUGH CONSTRUCTING AUXILIARY WEIGHTED GRAPH

(75) Inventors: Kevin John Lang, Mountain View, CA (US); Reid Marlow Andersen, San Mateo, CA (US)

(73) Assignee: Yahoo! Inc., Sunnyvale, CA (US)

( * ) Notice: Subject to any disclaimer, the term of this patent is extended or adjusted under 35 U.S.C. 154(b) by 571 days.

(21) Appl. No.: 11/875,752

(22) Filed: Oct. 19, 2007

(65) Prior Publication Data
US 2009/0106184 A1    Apr. 23, 2009

(51) Int. Cl.
G06F 17/00    (2006.01)
G06N 5/02    (2006.01)
(52) U.S. Cl. .......................................... 706/59; 707/101
(58) Field of Classification Search ................... 706/12, 706/14, 47, 59; 705/101
See application file for complete search history.

(56) References Cited

OTHER PUBLICATIONS

Fernandez-Baca et al., "Parametric Module Allocation on Partial k-trees", IEEE Transactions on Computers, vol. 42 (6), Jun. 1993, pp. 738-742.*
Abrams et al., "Optimal Delivery of Sponsored Search Advertisements Subject to Budget Constrains", Manuscript, 2007 (7 pages).
Babenko et al., "Experimental Evaluation of Parametric Maximum Flow Algorithms", *Workshop on Experimental Algorithms* (*WEA*), Rome, Italy, Jun. 6-8, 2007 (p. 256-269).
Boyd et al., "Convex Optimization", Cambridge University Press, 2004 (730 pages).
Joseph et al., "Clustering of Bipartite Advertiser-keyword Graph", *Workshop on Large Scale Clustering at IEEE*, ICDM 2003 (8 pages).
Charikar, "Greedy Approximation Algorithms for Finding Dense Components in a Graph", in *APPROX*, 2000 (p. 84-95).
Cherkassky et al., "On Implementing the Push-relabel Method for the Maximum Flow Problem", *Algorithmica*, 1997 (18 pages).

(Continued)

*Primary Examiner*—Donald Sparks
*Assistant Examiner*—Ola Olude Afolabi
(74) *Attorney, Agent, or Firm*—Weaver Austin Villeneuve & Sampson LLP (57) ABSTRACT

Methods and apparatus for locating a dense and isolated sub-graph from a weighted graph having multiple nodes and multiple weighted edges are described. Each node in the weighted graph represents an object. Each weighted edge in the weighted graph connects two nodes and represents the relationship between the two objects represented by the two corresponding nodes. To located the sub-graph, first, an auxiliary weighted graph is constructed using the weighted graph and three coefficients: $\alpha$, $\beta$, and $\gamma$, where $\alpha$, $\beta$, and $\gamma$ are greater than 0, $\alpha$ influences the number of nodes inside the sub-graph, $\beta$ influences the sum of the weights associated with the edges connecting a node inside the sub-graph and a node outside the sub-graph, and $\gamma$ influences the sum of the weights associated with the edges connecting two nodes both inside the sub-graph, and by adding a source node s and a sink node t. Next, the auxiliary weighted graph is partitioned into two parts using the s-t minimum cut algorithm. The sub-graph is the part associated with the sink node t in its original form, with the original undirected edges and unmodified edge weights and excluding the sink node t and all the new edges added during the construction of the auxiliary weighted graph.

18 Claims, 9 Drawing Sheets

OTHER PUBLICATIONS

Dhillon et al., A Fast Kernel-based Multilevel Algorithm for Graph Clustering, in *SIGKDD*, 2005 (6 pages).

Donath et al., "Lower Bounds for Partitioning of Graphs", IBM J. Res. Develop., 1973 (6 pages).

Feige et al., "The Dense K-subgraph Problem", *Algorithmica*, 2001 (14 pages).

Gallo et al., "A Fast Parametric Maximum Flow Algorithm and Applications", *SIAM Journal on Computing*, 1989 (p. 30-55).

Goldberg, "Finding a Maximum Density Subgraph", Technical Report, UCB CSD 84/71, University of California, Berkeley, 1984 (14 pages).

Lang et al., "A Flow-based Method For Improving the Expansion or Conductance of Graph Cuts", in *IPCO*, 2003 (p. 325-337).

Leighton et al., "Multicommodity Max-flow Min-cut Theorems and Their Use in Designing Approximation Algorithms", *Journal of the ACM (TACM)*, 1999, 46(6):787-832.

Shi et al., "Normalized Cuts and Image Segmentation", *PAMI*, 2000, 22(8):888-905.

Zhang et al., "A Simultaneous Maximum Flow Algorithm for the Selection Model", *INFORMS*, 2005 (6 pages).

Balinksi, "On a Selection Problem", *Management Science*, 1970, 17:3, 230-231.

Rhys., "A Selection Problem of Shared Fixed Costs and Network Flows", *Management Science*, 1970, 17:3, 200-207.

Zhang et al., "A Simultaneous Maximum Flow Algorithm", Hewlett-Packard Research Laboratories Technical Report HPL-2004-189 (15 pages).

Picard et al., "Selected Applications of Minimum Cuts in Networks", *INFOR-Canada J. Oper. Res.Inform. Process*, 20 (1982) 394-422.

Feige et al., "A Polylogarithmic Approximation of the Minimum Bisection", *SIAM J. Compute.*, 2002, 31(41):1090-1118.

Patkar et al., "Improving Graph Partitions Using Submodular Functions", *Discrete Appl. Math.*, 131, 2 (Sep. 2003), 535-553.

Narayanan et al., "Approximation Algorithms for Min-k-overlap Problems Using the Principal Lattice of Partitions Approach", *Journal of Algorithms*, Sep. 1996, v.21 n.2, p. 306-330.

Feige et al., "On the Densest K-Subgraph Problem", Weizmann Institute Technical Report CS 97-16, 1997 (18 pages).

Kannan et al., "Analyzing the Structure of Large Graphs", *Manuscript*, 1999 (10 pages).

Kortsarz et al., "Generating Sparse 2-spanners", *Algorithms*,1994, 17(2):222-236.

Kannan et al., "On Clusterings: Good, Bad and Spectral", *J. ACM*, 2004, 51(3):497-515.

Karypis et al., "A Fast and High Quality Multilevel Scheme for Partitioning Irregular Graphs", *SIAM J. Sci. Compute.*, 1998, 20(1):359-392.

Pothen et al., "Partitioning Sparse Matrices with Eigenvectors of Graphs", *SIAM Journal of Matrix Analysis and Applications*, 1990, 11:430-452.

Arora et al., "Expander Flows, Geometric Embeddings and Graph Partitioning", in *STOC '04: Proceedings of the Thirty-Sixth Annual ACM Symposium on Theory of Computing*, New York, NY, USA, ACM Press, 2004 (p. 222-231).

Dhillon, "Co-clustering Documents and Words Using Bipartite Spectral Graph Partitioning", in *ACM SIGKDD International Conference on Knowledge Discovery and Data Mining*, San Francisco, Aug. 2001 (p. 269-274).

Kluger et al., Spectral Biclustering of Microarray Data: Co-clustering Genes and Conditions, Genome Research, Apr. 2003, 13(4):703-716.

www2007workshops @easychair.org, E-mail to Kevin Lang, "WWW2007Workshops Notification", dated Mar. 16, 2007 (3 pages).

* cited by examiner

LOCATING DENSE AND ISOLATED SUB-GRAPHS THROUGH CONSTRUCTING AUXILIARY WEIGHTED GRAPH

BACKGROUND OF THE INVENTION

1. Field of the Invention

The present invention relates to systems, methods, and computer program products for locating a dense, isolated sub-graph from a weighted graph. More specifically, the sub-graph is selected based on the following criteria: (1) the number of nodes inside the sub-graph is relatively small; (2) the sum of the weights associated with the edges inside the sub-graph is relatively large; and (3) the sum of the weights associated with the edges crossing between the sub-graph and the rest of the weighted graph is relatively small.

2. Background of the Invention

Electronic commerce, commonly known as e-commerce, generates a significant amount of revenue each year. E-commerce may take various forms. Online shopping, Internet auction, e-marketing, etc. are but a few examples of common forms of e-commerce.

Often, business and marketing researches are conducted for the purpose of increasing e-commerce revenue. Usually, such researches analyze historical data representing different aspects and characteristics of e-commerce collected during a particular period of time in order to determine possible improvements. The data analyzed is typical and representative of the form of e-commerce under study.

However, analyzing e-commerce data is not always easy, due to the massive amount of data generated and collected during various transactions. For example, it may be very difficult, even impossible, to attempt optimization over a large set of data. Instead, it may be more practical and economical to focus on a smaller subset of data for analysis. Similarly, it may be very difficult to find behavioral patterns or relationships from a large dataset.

Accordingly, what are needed are systems and methods to isolate a meaningful subset of data from a large dataset for the purpose of research and analysis.

SUMMARY OF THE INVENTION

Broadly speaking, the present invention relates to systems and methods for locating a dense and isolated sub-graph from a weighted graph.

According to various specific embodiments of the invention, systems and methods for locating a sub-graph from a weighted graph is provided. The weighted graph has a plurality of nodes and a plurality of weighted edges, each weighted edge connecting two of the nodes. Each node represents an object of interest, and each weighted edge connecting a pair of nodes represents information about the relationship between the pair of nodes.

To locate a sub-graph from the weighted graph, first, an auxiliary weighted graph is constructed using the weighted graph and three coefficients: $\alpha$, $\beta$, and $\gamma$. $\alpha$ influences the number of nodes inside the resulting sub-graph; $\beta$ influences the sum of the weights associated with the edges crossing between the resulting sub-graph and the rest of the weighted graph; and $\gamma$ influences the sum of the weights associated with the edges completely inside the resulting sub-graph.

To construct the auxiliary weighted graph, first, multiply the weight associated with each edge in the weighted graph with $(1+\beta/\gamma)$. Next, add a source node s, and connect the source node s and each of the nodes in the weighted graph with a new edge. Assign a weight to each of the new edges connecting the source node s and each of the nodes in the weighted graph as $(\alpha/\gamma)$. Finally, add a sink node t, and connect each of the nodes in the weighted graph and the sink node t with a new edge. Assign a weight to each of the new edges connecting each of the nodes and the sink node t as the sum of the original weights, i.e., before the weight associated with each edge is multiplied by $(1+\beta/\gamma)$, of all the edges touching the corresponding node excluding the two new edges connecting the corresponding node with the source node s and the sink node t respectively.

After the auxiliary weighted graph is constructed, it is partitioned into two parts using an s-t minimum cut algorithm, such that one part is associated with the source node s and the other part is associated with the sink node t.

The sub-graph is the part that is associated with the sink node t in its original form, that is, with the original undirected edges and edge weights and excluding the sink node t and the new edges connecting the source node s and each node in the sub-graph and the new edges connecting each node in the sub-graph and the sink node t.

In addition, according to various specific embodiments of the invention, partitioning the auxiliary weighted graph using the s-t minimum cut algorithm may be achieved by first transforming the auxiliary weighted graph into a directional auxiliary weighted graph, and then partitioning the directional auxiliary weighted graph using an s-t maximum flow algorithm.

To transform the auxiliary weighted graph into a directional auxiliary weighted graph, i.e., assigning a direction to each edge, first, for each edge that connects the source node s and one of the nodes in the weighted graph, the direction of the edge points from the source node s to the node in the weighted graph. Next, for each edge that connects one of the nodes in the weighted graph and the sink node t, the direction of the edge points from the node in the weighted graph to the sink node t. Finally, for each edge that connects two of the nodes, i.e., a first node and a second node, in the weighted graph, the edge is replaced with two directional edges, one pointing from the first node to the second node and the other point from the second node to the first node.

These and other features, aspects, and advantages of the invention will be described in more detail below in the detailed description and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention. In addition, while the invention will be described in conjunction with the particular embodiments, it will be understood that it is not intended to limit the invention to the described embodiments. To the contrary, it is intended to cover alternatives, modifications, and equivalents as may be included within the spirit and scope of the invention as defined by the appended claims.

Figure 1:
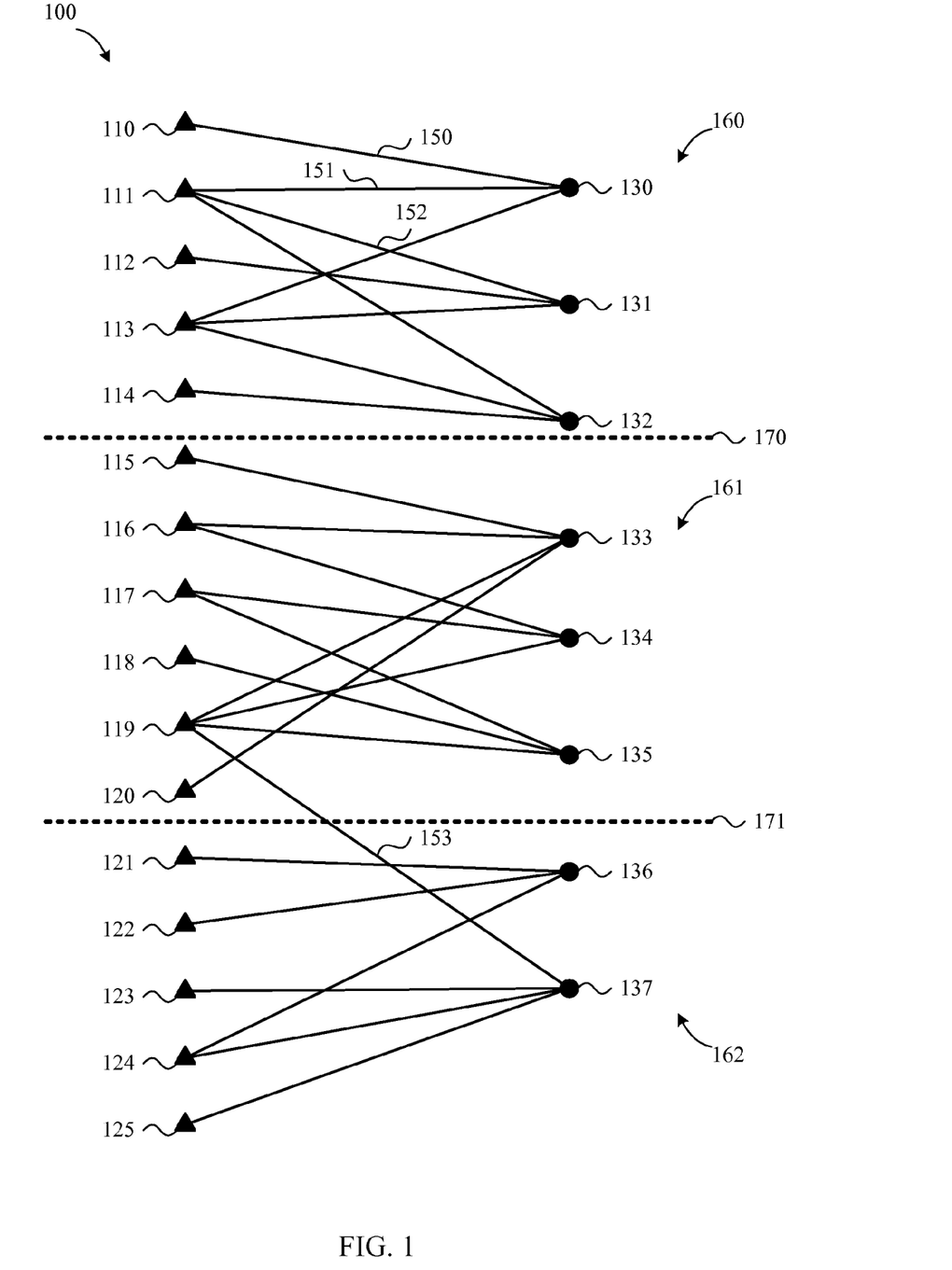
FIG. 1 illustrates an example of a weighted graph that may be used to depict relationships between various objects.

Often, relationships between various objects may be depicted by weighted graphs. FIG. 1 illustrates an example of a weighted graph, weighted graph 100, that may be used to depict, for example, an auction. During an auction, there are objects for people to bid on, and bidders who bid on various objects for certain amounts of money. To describe this scenario, each triangle-shaped node in weighted graph 100 may represent an object for bidding, and each circular-shaped node in weighted graph 100 may represent a bidder. When a bidder bids on an object, a line, i.e., an edge, may be used to connect the bidder and the object being bidded on. The amount of money the bidder bids on the object may be represented by the weight associated with the corresponding edge.

Thus, in weighted graph 100, for example, bidder 130 bids on objects 110, 111, and 113; bidder 131 bids on objects 111, 112, and 113; and so on. The weight associated with edge 150 represents the amount of money bidder 130 bids on object 110; the weighted associated with edge 151 represents the amount of money bidder 130 bids on object 111; the weighted associated with edge 152 represents the amount of money bidder 130 bids on object 112; and so on.

In a more specific example, one way for businesses to advertise their products and/or services is to bid on search phrases that describe their products and/or services. Then, when potential customers search for specific phrases using an online search engine, such as Yahoo!® Search, the businesses that have bidden on those phrases are listed among the search results. For example, an automobile seller may bid on phrases such as "sports car," "sports utility vehicle," "four-wheel drive," etc. A consumer electronics seller may bid on phrases such as "MP3 player," "digital camera," "plasma TV," etc. A sporting goods seller may bid on phrases such as "outdoor apparel," "running shoes," "camping gear," etc. Each triangle-shaped node in weighted graph 100 may represent a phrase for bidding, and each circular-shaped node in weighted graph 100 may represent a business bidding on selected phrases. When a business bids on a phrase, an edge connects the two corresponding nodes, and the weight associated with the edge represents the amount of money the business bids for the phrase.

In a different example, weighted graph 100 may be used to depict merchandise purchases. In this scenario, each triangle-shaped node in weighted graph 100 may represent a piece of merchandise for sale, and each circular-shaped node may represent a buyer. When a buyer purchases a particular piece of merchandise, an edge connects the buyer, i.e., a circular-shaped node, and the piece of merchandise, i.e., a triangular-shaped node. The weight associated with the edge may be used to represent the purchase price.

Sometimes, due to the nature of the business or other factors or characteristics of the scenarios depicted by the weighted graphs, parts of the graphs tend to cluster together. For example, in the auction scenario, perhaps certain people tend to bid on similar objects because of their interests or needs. Or, in the merchandise purchasing scenario, certain buyers tend to buy similar merchandise. In the above example of businesses bidding for search phrases, the automobile sellers are more likely to bid on phrases relating to automobiles, but are less likely to bid on phrases relating to consumer electronics or sporting goods. As shown in FIG. 1, the weighted graph is clustered into three parts, i.e., three sub-graphs 160, 161, and 162, separated by dash lines 170 and 171. There is no edge crossing between sub-graphs 160 and 161. However, there is an edge, edge 153, crossing between sub-graphs 161 and 162. Nevertheless, sub-graphs 160, 161, and 162 are relatively separated, i.e., isolated, from each other; that is, not many edges cross between the sub-graphs. Furthermore, each sub-graph 160, 161, and 162 has multiple nodes and edges; and if there is a large number of edges for the number of nodes in a given sub-graph, then that sub-graph would be considered dense.

It may be useful to locate a particular isolated sub-graph from a graph for the purposes of conducting research and analysis on the subset of data represented by the sub-graph. According to specific embodiments of the invention, to locate a dense and isolated sub-graph from a weighted graph, first, an auxiliary weighted graph is constructed using the weighted graph and three coefficients: $\alpha$, $\beta$, and $\gamma$, where $\alpha$, $\beta$, and $\gamma$ are greater than 0, $\alpha$ influences the number of nodes inside the sub-graph, $\beta$ influences the sum of the weights associated with the edges connecting a node inside the sub-graph and a node outside the sub-graph, and $\gamma$ influences the sum of the weights associated with the edges connecting two nodes both inside the sub-graph, and by adding a source node s and a sink node t. Next, the auxiliary weighted graph is partitioned into two parts using the s-t minimum cut algorithm. The sub-graph is the part associated with the sink node t in its original form excluding the sink node t and all the new edges added during the construction of the auxiliary weighted graph and with the original edge weights.

Figure 2:
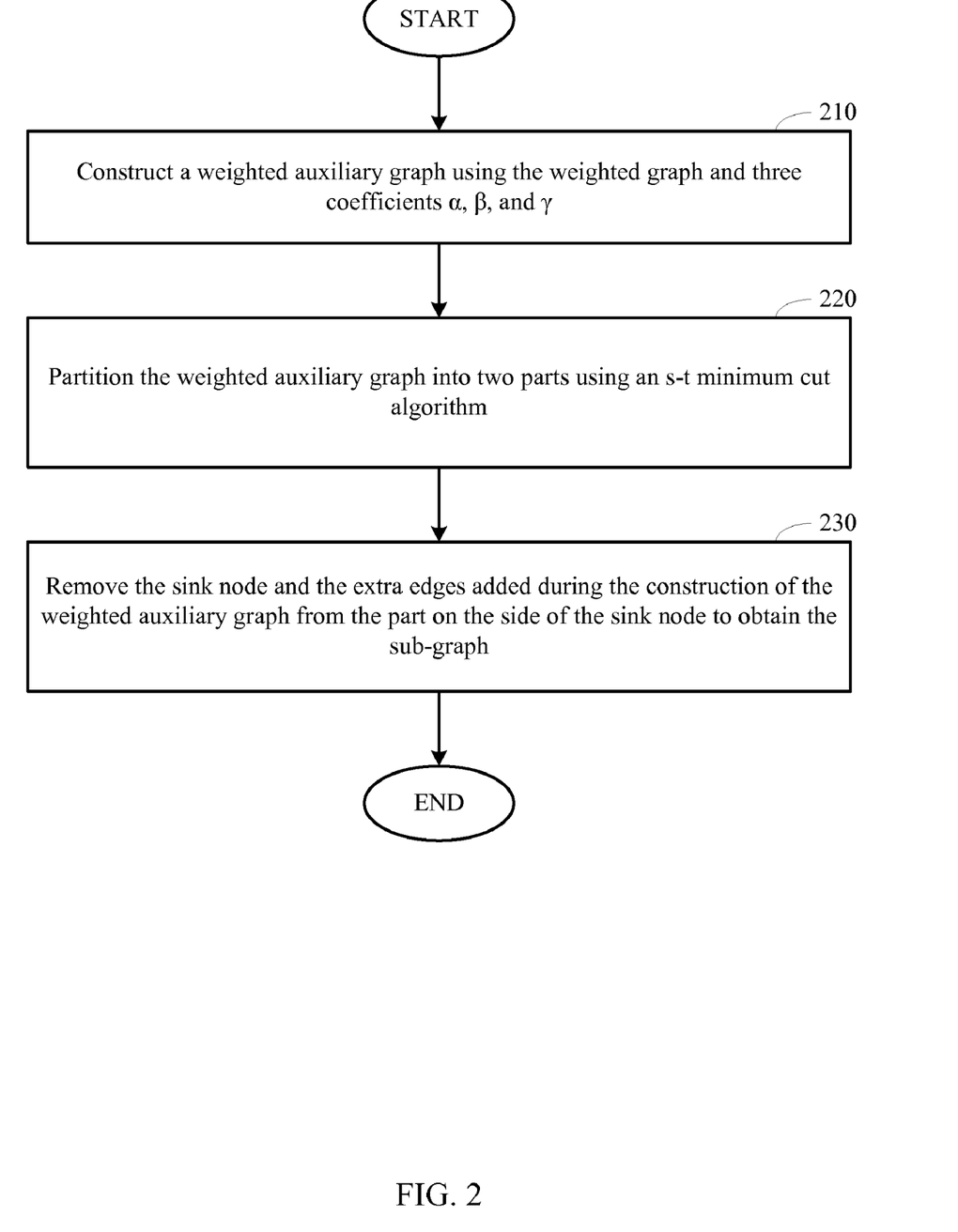
FIG. 2 illustrates a method of isolating a sub-graph from a weighted graph.

FIG. 2 illustrates a method of isolating a sub-graph from a weighted graph. The steps described in FIG. 2 will be explained in connection with FIGS. 4A-4E.

Figure 4A:
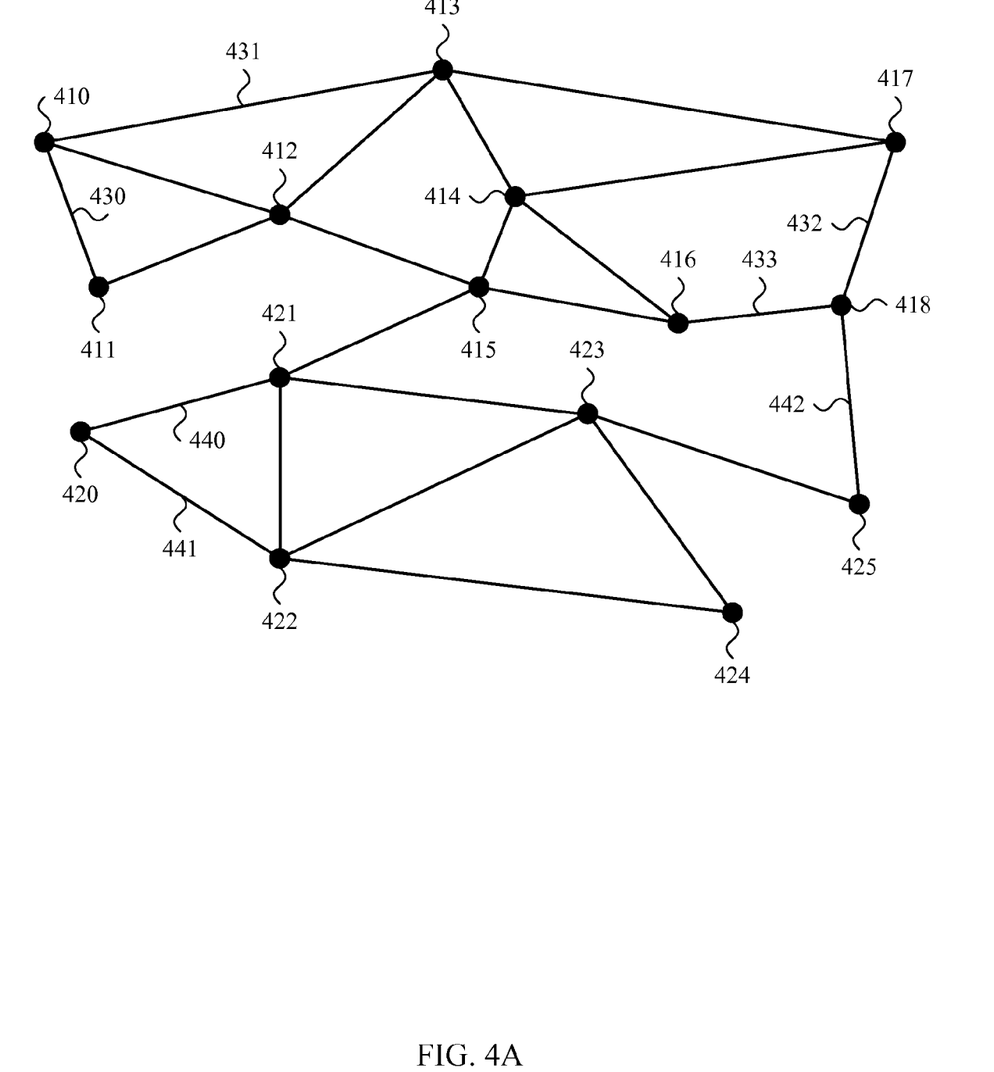
FIG. 4A illustrates an example of a weighted graph having multiple nodes and multiple weighted edges.

FIG. 4A illustrates an example of a weighted graph 400 having multiple nodes and multiple weighted edges. To simply the explanation, only 15 nodes are shown in this example. In practice, a weighted graph may have any number of nodes. Each node in weighted graph 400 represents an object. Some of the nodes are connected by weighted edges. For example, edge 430 connects nodes 410 and 411; edge 431 connects nodes 410 and 413; and so on. Of course, it is not necessary that every node is connected with every other node in the graph. The weight associated with each edge represents the relationship between the two nodes connected by the weighted edge. Thus, the weight associated with edge 430, $W_{430}$, represents the relationship between nodes 410 and 411;

the weight associated with edge 431, $W_{431}$, represents the relationship between nodes 410 and 413; and so on.

A dense, isolated sub-graph will be located from weighted graph 400, such that preferably, (1) the number of nodes inside the sub-graph is relatively small; (2) the sum of the weights associated with the edges completely inside the sub-graph is relatively large; and (3) the sum of the weights associated with the edges crossing between the inside of the sub-graph and the rest of the graph is relatively small. These characteristics of the sub-graph may be mathematically represented by an objective function that is to be maximized:

$$f(H)=\gamma M(H)-\beta B(H)-\alpha |H| \quad (1)$$

In equation (1), M(H) denotes two (2) times the sum of the weights associated with the edges completely inside the sub-graph, i.e., those edges each connecting two nodes both inside the sub-graph. B(H) denotes the sum of the weights associated with the edges crossing between the inside of the sub-graph and the rest of the graph, i.e., those edges each connecting a nodes inside the sub-graph and a node outside the sub-graph. And |H| denotes the number of nodes inside the sub-graph. $\alpha$, $\beta$, and $\gamma$ are three coefficients, each greater than 0. $\alpha$ influences the number of nodes inside the sub-graph, i.e., |H|. $\beta$ influences the sum of the weights associated with the edges connecting a node inside the sub-graph and a node outside the sub-graph, i.e., B(H). And $\gamma$ influences two (2) times the sum of the weights associated with the edges connecting two nodes both inside the sub-graph, i.e., M(H). By choosing the appropriate values for $\alpha$, $\beta$, and $\gamma$, and then maximizing f(H), a suitable sub-graph satisfying the three objectives may be located.

Note that a modified objective function f'(H) could be obtained by multiplying the right hand side of equation (1) by some positive constant k, but f'(H) would be mathematically equivalent to f(H) in the sense that the same sub-graphs H would maximize it. Also, equation (1) could be put into a superficially different form that is actually equivalent by multiplying the variables |H|, B(H), and M(H) by arbitrary positive constants k, b, and c, respectively and then dividing the parameters $\alpha$, $\beta$, and $\gamma$ by the same constants respectively, to obtain the following equation which is equivalent to equation (1).

$$f(H)=(\gamma/c)(cM(H))-(\beta/b)(bB(H))-(\alpha/k)(k|H|) \quad (2)$$

To locate a sub-graph H that maximizes f(H), first, an auxiliary weighted graph is constructed using the weighted graph, e.g. weighted graph 400, and the three coefficients: $\alpha$, $\beta$, and $\gamma$ (FIG. 2, step 210). This step is described in detail in FIG. 3 and in connection with FIG. 4B, which illustrates an auxiliary weighted graph 401 constructed from weighted graph 400 shown in FIG. 4A.

Figure 3:
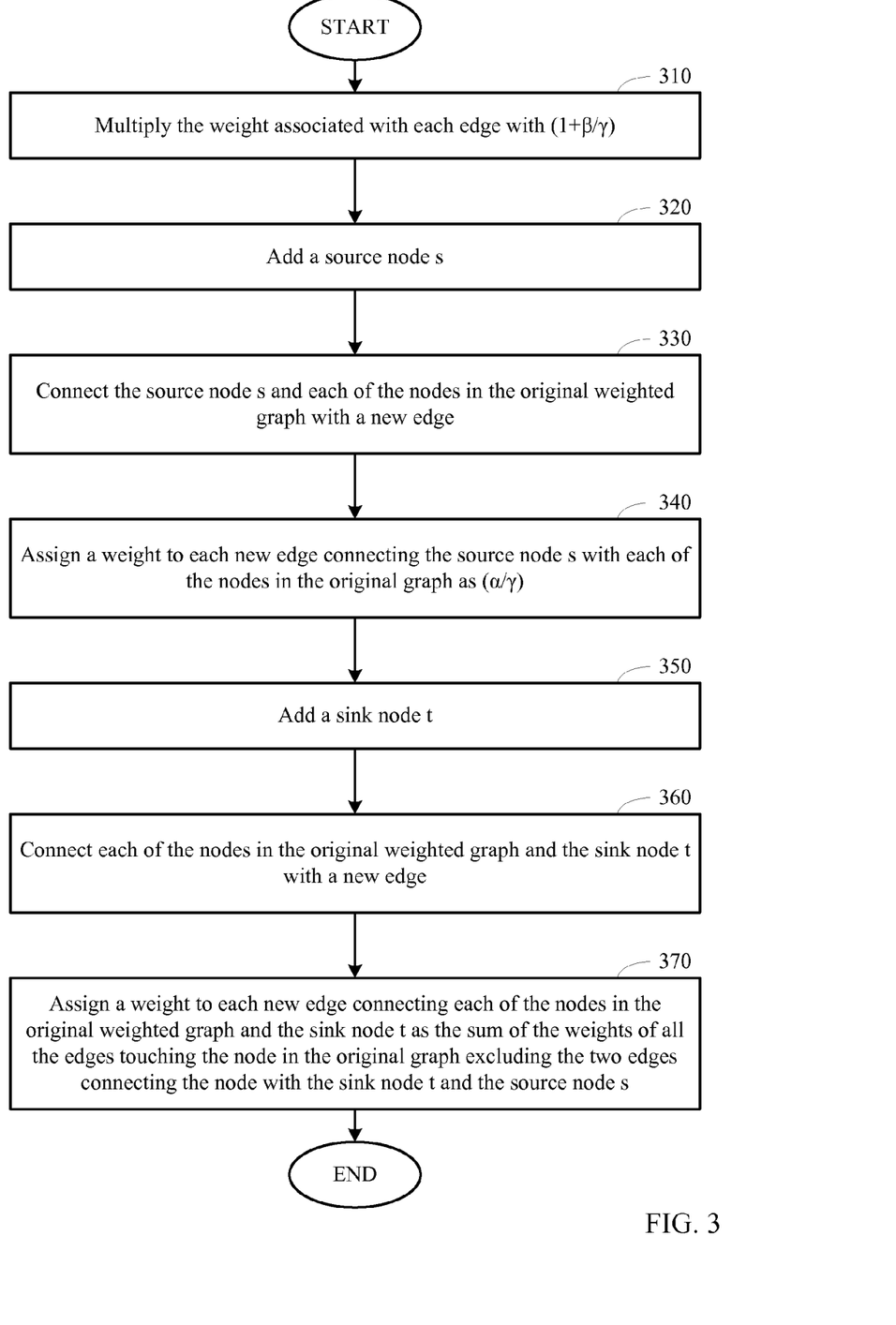
FIG. 3 illustrates a method of constructing an auxiliary weighted graph using a weighted graph and three coefficients.
Figure 4B:
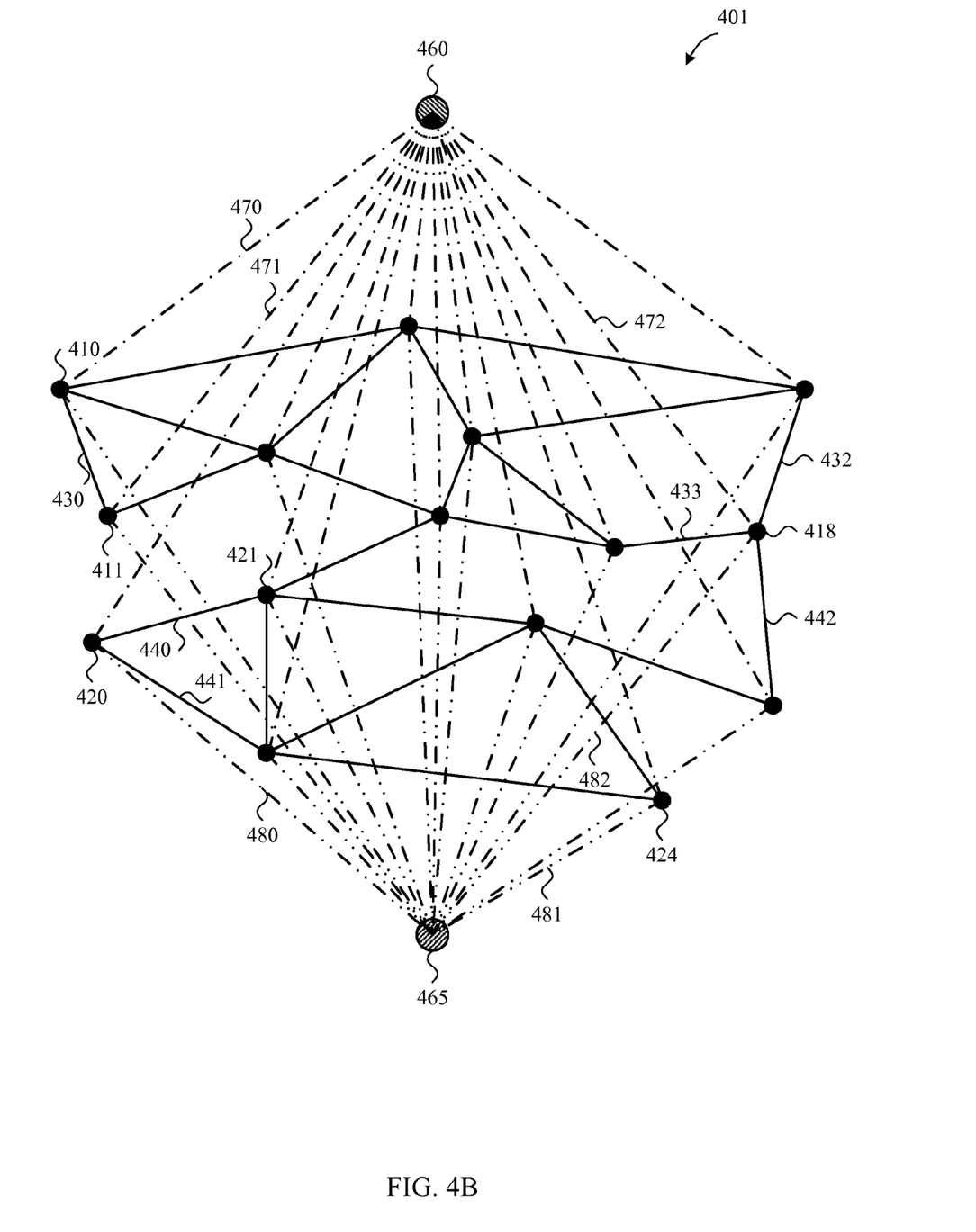
FIG. 4B illustrates an auxiliary weighted graph constructed from the weighted graph shown in FIG. 4A.

To construct the auxiliary weighted graph, first, the weight associated with each edge in original weighted graph 400 is multiplied by $(1+\beta/\gamma)$ (FIG. 3, step 310). For example, edge 430, which connects nodes 410 and 411 in weighted graph 400, has a weight of $W_{430}$. In auxiliary weighted graph 401, edge 430 has a weight of $(1+\beta/\gamma)W_{430}$. Similarly, edge 440, which connects nodes 420 and 421 in weighted graph 400, has a weight of $W_{440}$. In auxiliary weighted graph 401, edge 440 has a weight of $(1+\beta/\gamma)W_{440}$.

Next, a new source node s, node 460, is added (FIG. 3, step 320). Connect the source node s, i.e., node 460, and each of the nodes in the original weighted graph 400 with a new edge (FIG. 3, step 330). For example, in auxiliary weighted graph 401, new edge 470 connects source node 460 and node 410; new edge 471 connects source node 460 and node 411; and so on.

A weight is assigned to each new edge connecting source node 460 and each of the nodes in the original weighted graph 400 as $(\alpha/\gamma)$ (FIG. 3, step 340). In other words, every new edge connecting source node 460 and one of the nodes in weighted graph 400 has the same weight, $(\alpha/\gamma)$. Edge 470 has a weight of $(\alpha/\gamma)$; edge 471 has a weight of $(\alpha/\gamma)$; and so on.

Lastly, a new sink node t, node 465, is added (FIG. 3, step 350). Each of the nodes in the original weighted graph 400 and the sink node t, i.e., node 465, are connected with a new edge (FIG. 3, step 360). For example, in auxiliary weighted graph 401, new edge 480 connects node 420 and sink node 465; new edge 481 connects node 424 and sink node 465, and so on.

A weight is assigned to each edge connecting each of the nodes in the original weighted graph 400 and sink node 460 as the sum of the weights of all the edges touching the node in the original graph 400 excluding the two new edges connecting the node with sink node 460 and source node 465 (FIG. 3, step 370); in other words, the sum of the weights of all the original edges in weighted graph 400 that touch the node. For example, in auxiliary weighted graph 401, new edge 480 connects node 420 and sink node 465. There are two edges, edges 440 and 441, touching node 420 in the original weighted graph 400. Edge 440 has a weight $W_{440}$, and edge 441 has a weight $W_{441}$. Thus, new edge 480 has a weight that is the sum of the weights of edges 440 and 441, i.e., $(W_{440}+W_{441})$. Similarly, new edge 482 connects node 418 and sink node 465. There are three edges, edges 432, 433, and 442, touching node 418 in the original weighted graph 400. Edge 432 has a weight $W_{432}$; edge 433 has a weight $W_{433}$; and edge 442 has a weight $W_{442}$. Thus, new edge 482 has a weight that is the sum of the weights of edges 432, 433, and 442, i.e., $(W_{432}+W_{433}+W_{442})$. It is important to note that these are sums of original edge weights, not sums of modified edge weights that have been multiplied by $(1+\beta/\gamma)$.

Auxiliary weighted graph 401 is now ready to be partitioned. Note that it is not necessary to perform the steps in FIG. 3 in any specific order, as long as the same weighted auxiliary graph is the result of the procedure. For example, the source node s may be added (FIG. 3, step 320) before the multiplication of the weights associated with the edges (FIG. 3, step 310). Or, the sink node t may be added (FIG. 3, step 350) before the source node s (FIG. 3, step 320). In fact, it is not necessary to complete certain steps before performing another step. For example, the multiplication of the weights associated with the edges (FIG. 3, step 310) may be done in multiple parts, and same with steps 330, 340, 360, and 370.

In addition, when constructing the auxiliary weighted graph, there are a few variations that may be used as the weights associated with the edges, which are mathematically the same or equivalent. First, if the weight associated with every edge in the auxiliary weighted graph, including those edges in the original weighted graph, edges connecting the source node s and the nodes in the original weighted graph, and edges connecting the nodes in the original weighted graph and the sink node t, is multiplied or divided by the same positive constant, the result is mathematically the same.

Second, if the weights associated with each pair of the edges connecting a node in the original weighted graph with the source node s and the sink node t respectively are added by the same constant, the result is mathematically the same. For example, in auxiliary weighted graph 401, edge 472 connects source node 460 and node 418, and edge 482 connects node 418 and sink node 465. If the weight associated with edge 472 and the weight associated with edge 482 are added by the same constant, it does not affect the result of finding an s-t minimum cut in the auxiliary weighted graph 401. In this case, the constant added to one pair of edges connecting a first node with the source node s and the sink node t does not need to be the same as the constant added to another pair of edges connecting a second node with the source node s and the sink node t. Thus, the two edges connecting, for example, node 411 with source node 460 and sink node 465 may be added a different constant than the constant added to the two edges connecting node 418 with source node 460 and sink node 465.

Once the auxiliary weighted graph has been constructed, it is partitioned using an s-t minimum cut algorithm (FIG. 2, step 220). The s-t minimum cut algorithm, also referred to as the s-t min cut algorithm, is a well-studied and well-documented algorithm in the field of computer science. It is based on the "maximum-flow minimum-cut theorem," an optimization theory stating that, in any network, the maximum amount of flow equals the capacity of the minimum cut.

According to the maximum-flow minimum-cut theorem, to partition a weighted graph, e.g., auxiliary weighted graph 401, using the s-t minimum cut algorithm is mathematically equivalent to partitioning the weighted graph using an s-t maximum flow algorithm.

Figure 4C:
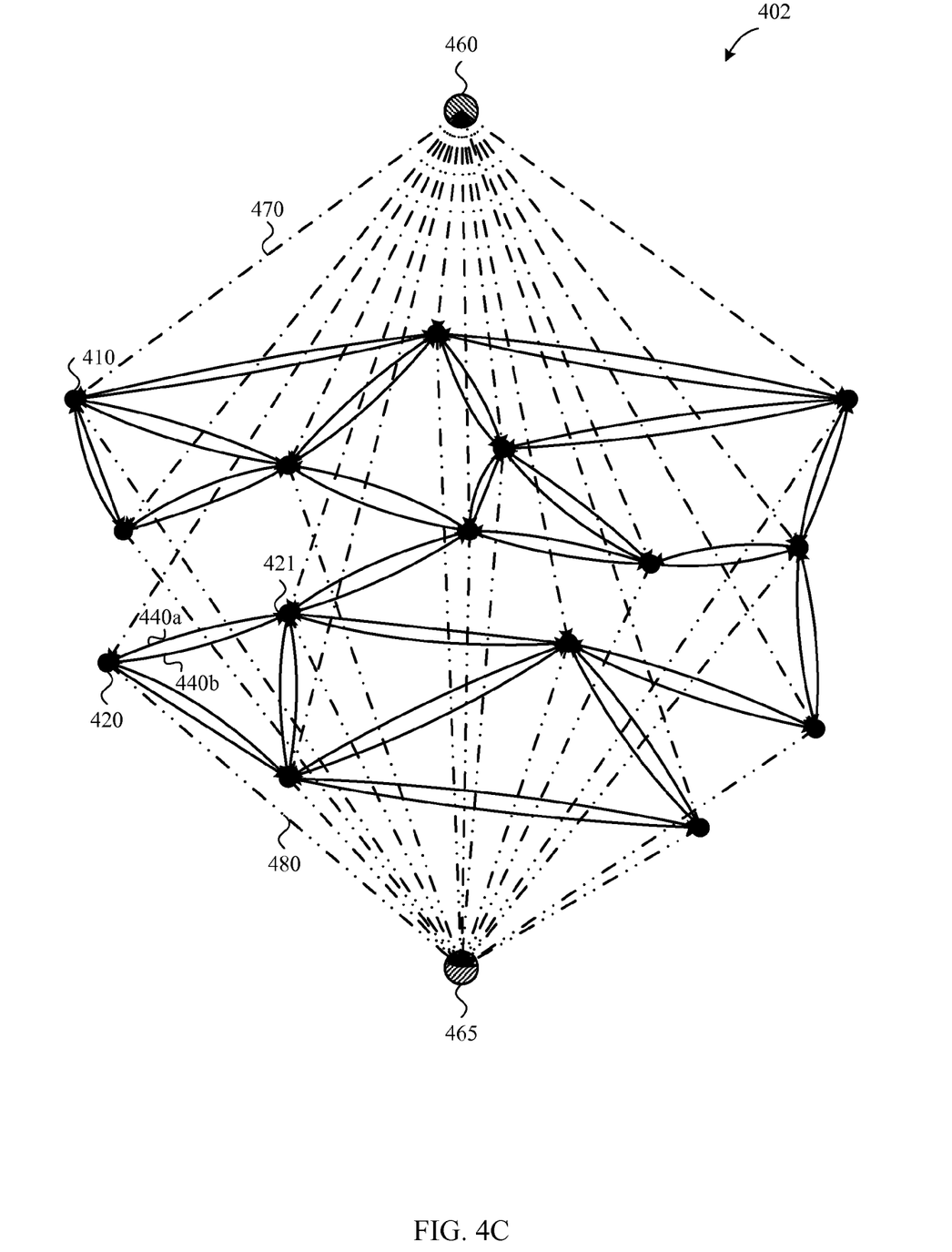
FIG. 4C illustrates a directional auxiliary weighted graph constructed from the auxiliary weighted graph shown in FIG. 4B.

According to various embodiments of the invention, first the auxiliary weighted graph is transformed into a directional auxiliary weighted graph. That is, the edges in the auxiliary weighted graph are assigned directions. FIG. 4C illustrates a directional auxiliary weighted graph constructed from auxiliary weighted graph 401 shown in FIG. 4B, and the directions of the edges are indicated by arrows. In directional auxiliary weighted graph 402, the edges that connect source node 465 and the nodes in weighted graph 400 each has a direction of pointing from source node 460 to the corresponding node in weighted graph 400. For example, edge 470 connects source node 460 and node 410, and its direction points from source node 460 to node 410. The edges that connect the nodes in weighted graph 400 and sink node 465 each has a direction of pointing from the corresponding node in weighted graph 400 to sink node 465. For example, in directional auxiliary weighted graph 402, edge 480 connects node 420 and sink node 465, and its direction points from node 420 to sink node 465.

Each of the edges that connect two nodes in weighted graph 400 is replaced with a pair of edges pointing in opposite directions connecting the same two nodes. Each of the pair of edges has the same weight has the corresponding original edge. For example, in auxiliary weighted graph 401, edge 440 connects nodes 420 and 421. In directional auxiliary weighted graph 402, edge 440 is replaced by a pair of edges 440*a* and 440*b*, each connecting nodes 420 and 421. Edge 440*a* points from node 421 to node 420, and edge 440*b* points from node 420 to node 421. Edges 440*a* and 440*b* have the same weight as edge 440.

Figure 4D:
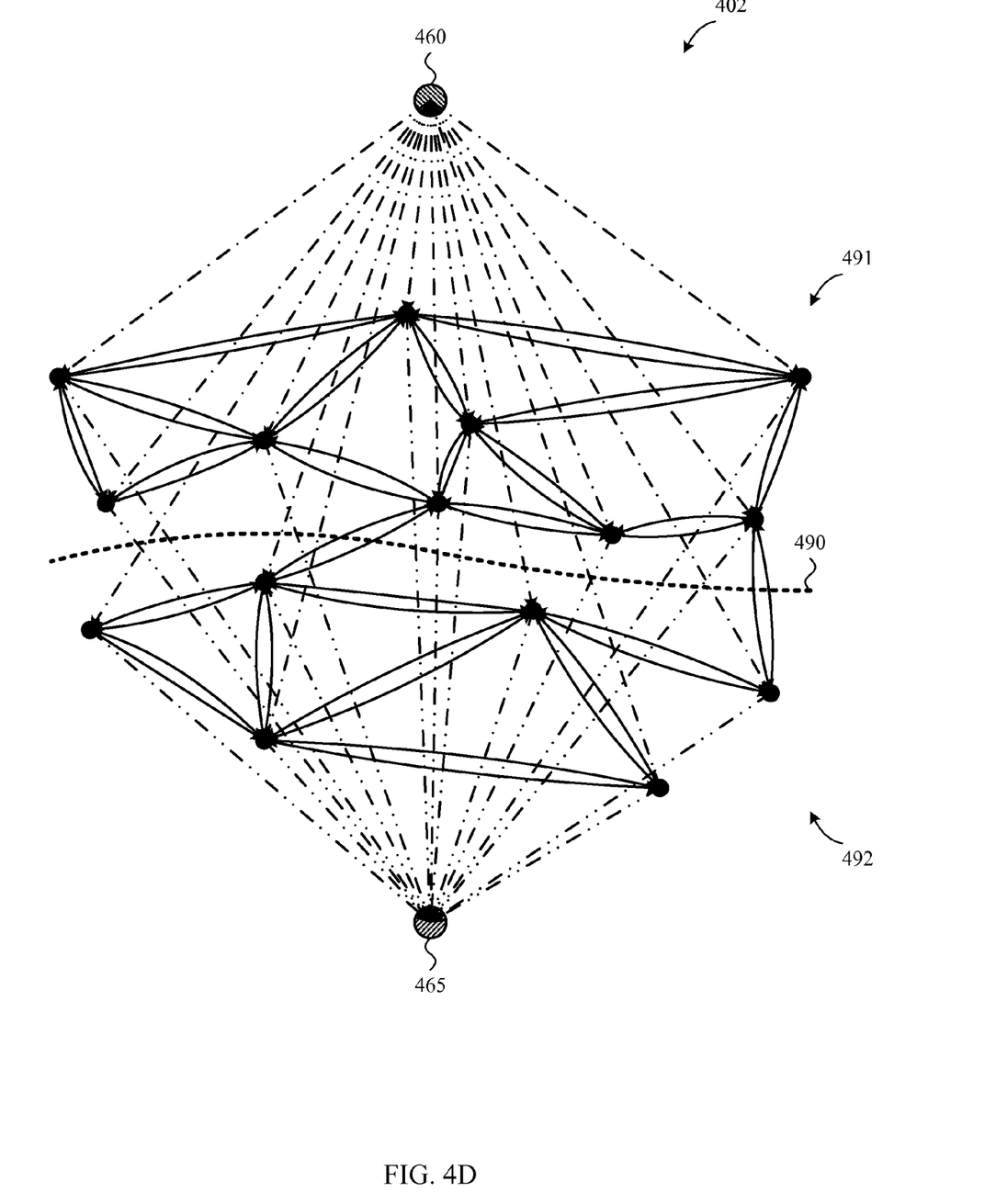
FIG. 4D illustrates the directional auxiliary weighted graph shown in FIG. 4C being partitioned into two parts using the s-t maximum flow algorithm.

Next, the directional auxiliary weighted graph is partitioned into two parts using the s-t maximum flow algorithm, with one part associated with the source node and the other part associated with the sink node. FIG. 4D illustrates directional auxiliary weighted graph 402 shown in FIG. 4C being partitioned into two parts using the s-t maximum flow algorithm. The boundary of the two partitions is marked by line 490. The first part, partition 491, is associated with source node 460, and the second part, partition 492, is associated with sink node 465.

Figure 4E:
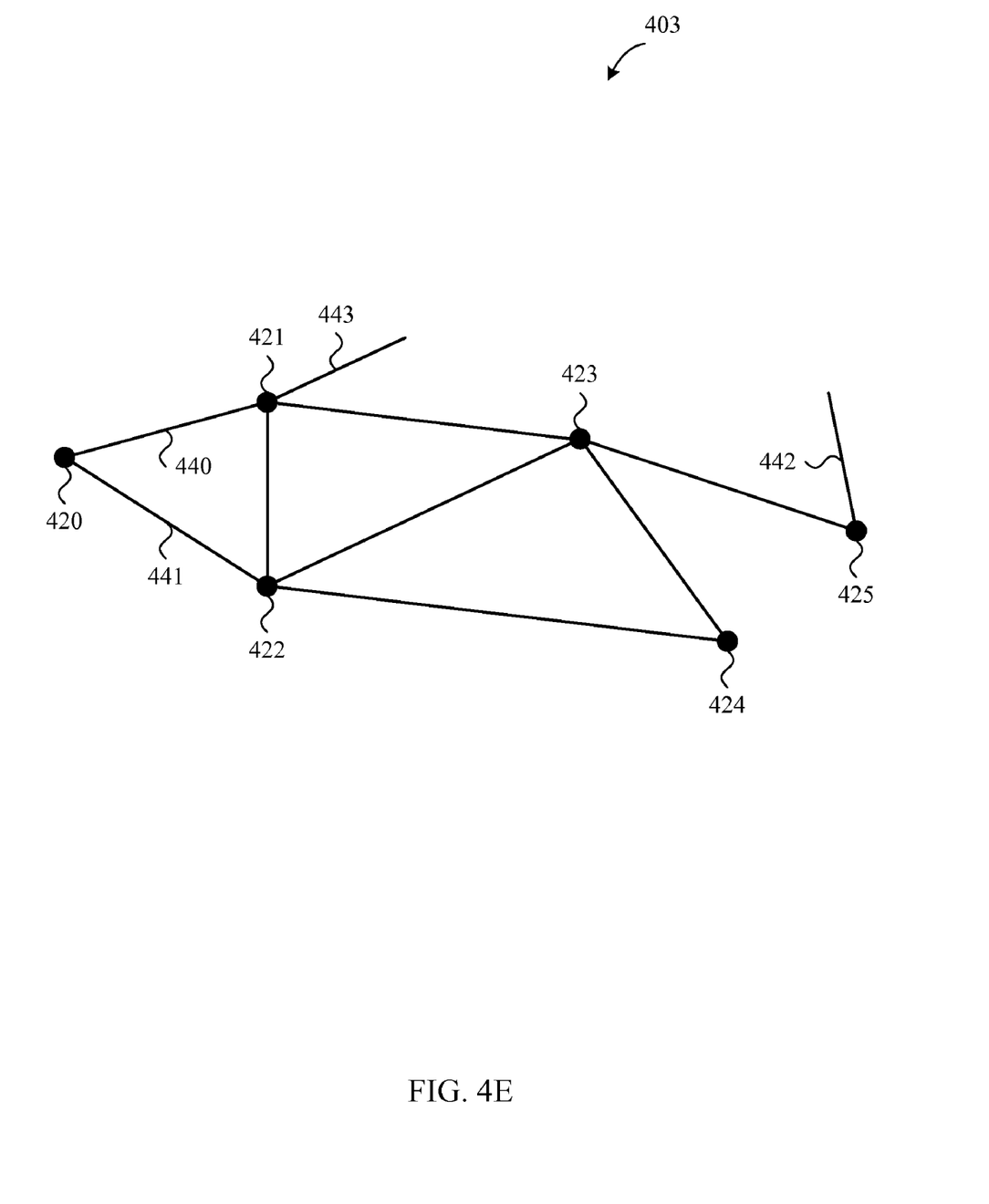
FIG. 4E illustrates the resulting sub-graph located from the weighted graph shown in FIG. 4A.

The sub-graph that is the method's output is the part associated with the sink node t, but in its original form; that is, with the original undirected edges and unmodified edge weights, and excluding the sink node t and the new edges connecting the nodes in the original weighted graph with either the source node s or the sink node t. FIG. 4E illustrates the resulting sub-graph located from weighted graph 400 shown in FIG. 4A. To show a clear image of sub-graph 403, the extra edges and the sink node t have been removed (FIG. 2, step 230). In addition, the edges connecting the nodes have been returned to its original forms.

Sub-graph 403 has 6 nodes and 10 edges. Eight of the 10 edges are internal edges lying completely inside sub-graph 403; that is, each of these 8 edges connects two nodes inside sub-graph 403. For example, edge 440 connects nodes 420 and 421, and edge 441 connects nodes 420 and 422. Two of the 10 edges, edges 442 and 443, are boundary edges which cross from inside of sub-graph 403 to the rest of the weighted graph 400; that is, each edge connects one node inside sub-graph 403 and one node outside of sub-graph 403. Further research and analysis may be performed on sub-graph 403.

A desirable sub-graph is located when the objective function f(H) in equation (1) is maximized, thus maximizing M(H), minimizing B(H), and minimizing |H|. However, there may not always be a single best solution to the tri-criterion optimization problem. Often times, multiple solutions may be available, and there is a tradeoff between the relative importance of the three variables, which is controlled by the three coefficients, $\alpha$, $\beta$, and $\gamma$.

The three coefficients, $\alpha$, $\beta$, and $\gamma$, in the objective function f(H) influence the three variables respectively, and thus the resulting sub-graph. By varying the values of $\alpha$, $\beta$, and $\gamma$, the resulting sub-graph differs. In other words, each set of different $\alpha$, $\beta$, and $\gamma$ values can result in a different sub-graph. It may be desirable to experiment with different combinations of $\alpha$, $\beta$, and $\gamma$ values in order to locate the most desirable sub-graph for study and analysis.

In addition, to simplify calculations, one of the coefficients, e.g., $\gamma$, may be set to 1, and the values of the other two coefficients, e.g. $\alpha$ and $\beta$, may be adjusted accordingly. Again, different combinations of $\alpha$ and $\beta$ values can result in different sub-graphs.

Figure 5:
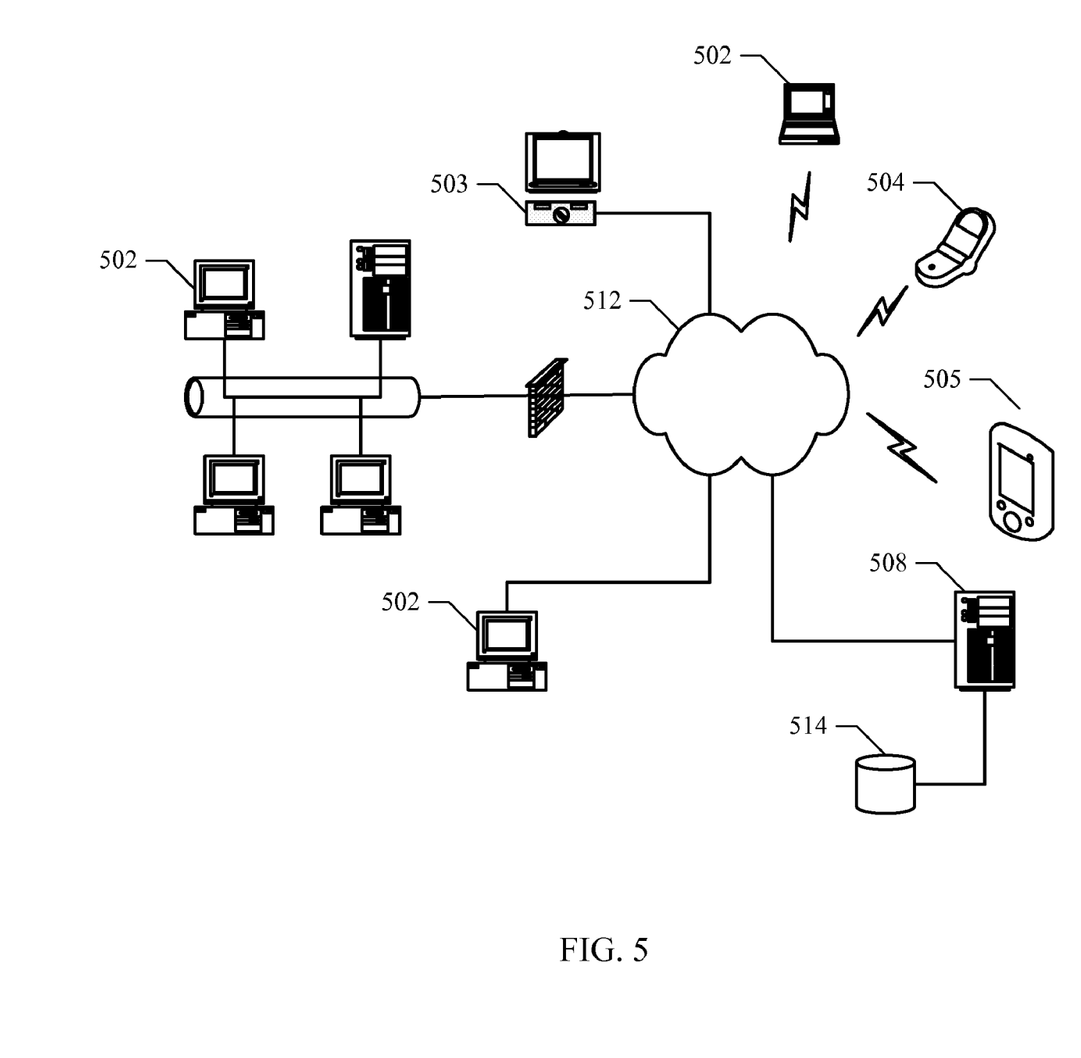
FIG. 5 is a simplified diagram of a network environment in which specific embodiments of the present invention may be implemented.

The methods shown in FIGS. 2 and 3 may be implemented as computer software programs. FIG. 5 is a simplified diagram of a network environment in which specific embodiments of the present invention may be implemented. The various aspects of the invention may be practiced in a wide variety of network environments (represented by network 512) including, for example, TCP/IP-based networks, telecommunications networks, wireless networks, etc. In addition, the computer program instructions with which embodiments of the invention are implemented may be stored in any type of computer-readable media, and may be executed according to a variety of computing models including, for example, on a stand-alone computing device, or according to a distributed computing model in which various of the functionalities described herein may be effected or employed at different locations. The software program implementing various embodiments may be executed on the server 508, computers 502 and 503, etc.

The data used to construct the weight graph may be stored in one or more databases, such as database 514. The resulting sub-graph may also be stored in database 514.

While this invention has been described in terms of several preferred embodiments, there are alterations, permutations, and various substitute equivalents, which fall within the scope of this invention. It should also be noted that there are many alternative ways of implementing the methods and apparatuses of the present invention. It is therefore intended that the following appended claims be interpreted as including all such alterations, permutations, and various substitute equivalents as fall within the true spirit and scope of the present invention.

What is claimed is:

1. A method of locating a sub-graph from a weighted graph, where in the weighted graph has a plurality of nodes and a plurality of weighted edges, each of the nodes represents an object, each of the weighted edges connects two of the nodes and is associated with a weight representing a relationship between the two objects represented by the two corresponding nodes, comprising a computer executing the steps of:

constructing an auxiliary weighted graph based on the weighted graph, a first coefficient $\alpha$, a second coefficient $\beta$, and a third coefficient $\gamma$, wherein $\alpha$, $\beta$, and $\gamma$ are greater than 0, $\alpha$ influences a number of nodes inside the sub-graph, $\beta$ influences a sum of the weights associated with the edges connecting a node inside the sub-graph and a node outside the sub-graph, $\gamma$ influences a sum of the weights associated with the edges connecting two nodes both inside the sub-graph, and constructing the auxiliary weighted graph includes multiplying each weight associated with each of the weighted edges with $(1+\beta/\gamma)$;

adding a source node s;

connecting the source node s and each of the nodes with a new edge;

assigning a weight to each of the new edges connecting the source node s and each of the nodes as $(\alpha/\gamma)$;

adding a sink node t;

connecting each of the nodes and the sink node t with a new edge; and assigning a weight to each of the new edges connecting each of the nodes and the sink node t as a sum of the weights of all the edges touching the corresponding node excluding the two new edges connecting the corresponding node with the source node s and the sink node t respectively; and partitioning the auxiliary weighted graph into two parts using an s-t minimum cut algorithm, wherein a first one of the two parts is associated with the source node s and a second one of the two parts is associated with the sink node t, wherein the sub-graph is the second part of the auxiliary weighted graph associated with the sink node t excluding the sink node t, the new edges connecting the source node s and each of the nodes in the second part of the auxiliary graph, and the new edges connecting each of the nodes in the second part of the auxiliary graph and the sink node t.

2. The method, as recited in claim 1, wherein each of a first portion of the nodes represents an item for bidding in an auction, each of a second portion of the nodes represents a bidder in the auction, each of the edges connects a node from the first portion of the nodes and a node from the second portion of the nodes, and the weight associated with each of the edges represents an amount of money that the corresponding bidder bids on the corresponding item.

3. The method, as recited in claim 1, further comprising:

removing from the second part of the auxiliary weighted graph associated with the sink node t the sink node t, the new edges connecting the source node s and each of the nodes in the second part of the auxiliary graph, and the new edges connecting each of the nodes in the second part of the auxiliary graph and the sink node t to obtain the sub-graph.

4. The method, as recited in claim 1, wherein partitioning the auxiliary weighted graph into two parts using an s-t minimum cut algorithm comprises:

converting the auxiliary weighted graph into a directional auxiliary weighted graph, such that the edges in the directional auxiliary weighted have directions; and partitioning the directional auxiliary weighted graph into two parts using an s-t maximum flow algorithm, wherein a first one of the two parts is associated with the source node s and a second one of the two parts is associated with the sink node t.

5. The method, as recited in claim 4, wherein converting the auxiliary weighted graph into a directional auxiliary weighted graph comprises:

assigning each edge connecting the source node s and one of the nodes in the weighted graph a direction pointing from the source node s to the corresponding node in the weighted graph;

assigning each edge connecting one of the nodes in the weighted graph and the sink node t a direction pointing from the corresponding node in the weighted graph to the sink node t;

replacing each of the weighted edges in the weighted graph connecting two nodes with a pair of directional weighted edges connecting the same two nodes, wherein a first one of the pair of directional weighted edges points from a first one of the two nodes to a second one of the two nodes, a second one of the pair of directional weighted edges points from the second one of the two nodes to the first one of the two nodes, and each of the pair of direction weighted edges is associated with the same weight associated with the weighted edge being replaced.

6. The method, as recited in claim 1, further comprising:

analyzing the sub-graph for business research.

7. A system for locating a sub-graph from a weighted graph, wherein the weighted graph has a plurality of nodes and a plurality of weighted edges, each of the nodes represents an object, each of the weighted edges connects two of the nodes and is associated with a weight representing a relationship between the two objects represented by the two corresponding nodes, the system comprising at least one computing device configured to:

construct an auxiliary weighted graph based on the weighted graph, a first coefficient $\alpha$, a second coefficient $\beta$, and a third coefficient $\gamma$, wherein $\alpha$, $\beta$, and $\gamma$ are greater than 0, $\alpha$ influences a number of nodes inside the sub-graph, $\beta$ influences a sum of the weights associated with the edges connecting a node inside the sub-graph and a node outside the sub-graph, $\gamma$ influences a sum of the weights associated with the edges connecting two nodes both inside the sub-graph, and construct the auxiliary weighted graph includes multiply each weight associated with each of the weighted edges with $(1+\beta/\gamma)$;

add a source node s;

connect the source node s and each of the nodes with a new edge;

assign a weight to each of the new edges connecting the source node s and each of the nodes as $(\alpha/\gamma)$;

add a sink node t;

connect each of the nodes and the sink node t with a new edge; and assign a weight to each of the new edges connecting each of the nodes and the sink node t as a sum of the weights of all the edges touching the corresponding node excluding the two new edges connecting the corresponding node with the source node s and the sink node t respectively; and partition the auxiliary weighted graph into two parts using an s-t minimum cut algorithm, wherein a first one of the two parts is associated with the source node s and a second one of the two parts is associated with the sink node t, wherein the sub-graph is the second part of the auxiliary weighted graph associated with the sink node t excluding the sink node t, the new edges connecting the source node s and each of the nodes in the second part of the auxiliary graph, and the new edges connecting each of the nodes in the second part of the auxiliary graph and the sink node t.

8. The system, as recited in claim 7, wherein each of a first portion of the nodes represents an item for bidding in an auction, each of a second portion of the nodes represents a bidder in the auction, each of the edges connects a node from the first portion of the nodes and a node from the second portion of the nodes, and the weight associated with each of the edges represents an amount of money that the corresponding bidder bids on the corresponding item.

9. The system, as recited in claim 7, wherein the at least one computing device is further configured to:
   remove from the second part of the auxiliary weighted graph associated with the sink node t the sink node t, the new edges connecting the source node s and each of the nodes in the second part of the auxiliary graph, and the new edges connecting each of the nodes in the second part of the auxiliary graph and the sink node t to obtain the sub-graph.

10. The system, as recited in claim 7, wherein partition the auxiliary weighted graph into two parts using an s-t minimum cut algorithm comprises:
    convert the auxiliary weighted graph into a directional auxiliary weighted graph, such that the edges in the directional auxiliary weighted have directions; and
    partition the directional auxiliary weighted graph into two parts using an s-t maximum flow algorithm, wherein a first one of the two parts is associated with the source node s and a second one of the two parts is associated with the sink node t.

11. The system, as recited in claim 10, wherein convert the auxiliary weighted graph into a directional auxiliary weighted graph comprises:
    assign each edge connecting the source node s and one of the nodes in the weighted graph a direction pointing from the source node s to the corresponding node in the weighted graph;
    assign each edge connecting one of the nodes in the weighted graph and the sink node t a direction pointing from the corresponding node in the weighted graph to the sink node t;
    replace each of the weighted edges in the weighted graph connecting two nodes with a pair of directional weighted edges connecting the same two nodes, wherein a first one of the pair of directional weighted edges points from a first one of the two nodes to a second one of the two nodes, a second one of the pair of directional weighted edges points from the second one of the two nodes to the first one of the two nodes, and each of the pair of direction weighted edges is associated with the same weight associated with the weighted edge being replaced.

12. The system, as recited in claim 7, wherein the at least one computing device is further configured to:
    analyze the sub-graph for business research.

13. A computer program product for locating a sub-graph from a weighted graph, wherein the weighted graph has a plurality of nodes and a plurality of weighted edges, each of the nodes represents an object, each of the weighted edges connects two of the nodes and is associated with a weight representing a relationship between the two objects represented by the two corresponding nodes, the computer program product comprising a computer-readable medium having a plurality of computer program instructions stored therein, which are operable to cause at least one computing device to:
    construct an auxiliary weighted graph based on the weighted graph, a first coefficient $\alpha$, a second coefficient $\beta$, and a third coefficient $\gamma$, wherein $\alpha$, $\beta$, and $\gamma$ are greater than 0, $\alpha$ influences a number of nodes inside the sub-graph, $\beta$ influences a sum of the weights associated with the edges connecting a node inside the sub-graph and a node outside the sub-graph, $\gamma$ influences a sum of the weights associated with the edges connecting two nodes both inside the sub-graph, and construct the auxiliary weighted graph includes
        multiply each weight associated with each of the weighted edges with $(1+\beta/\gamma)$;
        add a source node s;
        connect the source node s and each of the nodes with a new edge;
        assign a weight to each of the new edges connecting the source node s and each of the nodes as $(\alpha/\gamma)$;
        add a sink node t;
        connect each of the nodes and the sink node t with a new edge; and
        assign a weight to each of the new edges connecting each of the nodes and the sink node t as a sum of the weights of all the edges touching the corresponding node excluding the two new edges connecting the corresponding node with the source node s and the sink node t respectively; and
    partition the auxiliary weighted graph into two parts using an s-t minimum cut algorithm, wherein a first one of the two parts is associated with the source node s and a second one of the two parts is associated with the sink node t,
    wherein the sub-graph is the second part of the auxiliary weighted graph associated with the sink node t excluding the sink node t, the new edges connecting the source node s and each of the nodes in the second part of the auxiliary graph, and the new edges connecting each of the nodes in the second part of the auxiliary graph and the sink node t.

14. The computer program product, as recited in claim 13, wherein each of a first portion of the nodes represents an item for bidding in an auction, each of a second portion of the nodes represents a bidder in the auction, each of the edges connects a node from the first portion of the nodes and a node from the second portion of the nodes, and the weight associated with each of the edges represents an amount of money that the corresponding bidder bids on the corresponding item.

15. The computer program product, as recited in claim 13, wherein the plurality of computer program instructions are further operable to cause the at least one computing device to:
    remove from the second part of the auxiliary weighted graph associated with the sink node t the sink node t, the new edges connecting the source node s and each of the nodes in the second part of the auxiliary graph, and the new edges connecting each of the nodes in the second part of the auxiliary graph and the sink node t to obtain the sub-graph.

16. The computer program product, as recited in claim 13, wherein partition the auxiliary weighted graph into two parts using an s-t minimum cut algorithm comprises:

convert the auxiliary weighted graph into a directional auxiliary weighted graph, such that the edges in the directional auxiliary weighted have directions; and partition the directional auxiliary weighted graph into two parts using an s-t maximum flow algorithm, wherein a first one of the two parts is associated with the source node s and a second one of the two parts is associated with the sink node t.

17. The computer program product, as recited in claim 16, wherein convert the auxiliary weighted graph into a directional auxiliary weighted graph comprises:

assign each edge connecting the source node s and one of the nodes in the weighted graph a direction pointing from the source node s to the corresponding node in the weighted graph;

assign each edge connecting one of the nodes in the weighted graph and the sink node t a direction pointing from the corresponding node in the weighted graph to the sink node t;

replace each of the weighted edges in the weighted graph connecting two nodes with a pair of directional weighted edges connecting the same two nodes, wherein a first one of the pair of directional weighted edges points from a first one of the two nodes to a second one of the two nodes, a second one of the pair of directional weighted edges points from the second one of the two nodes to the first one of the two nodes, and each of the pair of direction weighted edges is associated with the same weight associated with the weighted edge being replaced.

18. The computer program product, as recited in claim 13, wherein the plurality of computer program instructions are further operable to cause the at least one computing device to:

analyze the sub-graph for business research.

\* \* \* \* \*